United States Patent
Okubo et al.

(10) Patent No.: US 9,139,088 B2
(45) Date of Patent: Sep. 22, 2015

(54) SYSTEM AND METHOD FOR HYBRID VEHICLE CONTROL DURING WHEEL SLIP EVENTS TO LIMIT GENERATOR SPEED

(71) Applicant: FORD GLOBAL TECHNOLOGIES, LLC, Dearborn, MI (US)

(72) Inventors: Shunsuke Okubo, Belleville, MI (US); Jonathan Andrew Butcher, Farmington, MI (US); Shailesh Shrikant Kozarekar, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 14/014,513

(22) Filed: Aug. 30, 2013

(65) Prior Publication Data
US 2015/0060173 A1    Mar. 5, 2015

(51) Int. Cl.
*B60K 28/16*    (2006.01)
*B60K 6/48*    (2007.10)
*B60L 15/00*    (2006.01)
*B60W 20/00*    (2006.01)
*B60K 6/445*    (2007.10)
*B60W 10/06*    (2006.01)

(52) U.S. Cl.
CPC .............. *B60K 28/16* (2013.01); *B60K 6/445* (2013.01); *B60K 6/48* (2013.01); *B60L 15/00* (2013.01); *B60W 10/06* (2013.01); *B60W 20/00* (2013.01); *B60K 2006/4808* (2013.01); *B60W 2510/082* (2013.01); *B60W 2710/0644* (2013.01); *Y10S 903/902* (2013.01)

(58) Field of Classification Search
CPC ...... B60W 10/08; B60K 28/16; B60K 28/165
See application file for complete search history.

(56) References Cited

U.S. PATENT DOCUMENTS

| | | | |
|---|---|---|---|
| 3,898,937 | A | 8/1975 | Johnson |
| 4,095,147 | A | 6/1978 | Mountz |
| 4,924,395 | A | 5/1990 | Evans et al. |

(Continued)

FOREIGN PATENT DOCUMENTS

| | | |
|---|---|---|
| EP | 1316460 | 6/2003 |
| WO | WO2009092218 | 7/2009 |

OTHER PUBLICATIONS

Okubo, Shunsuke; Butcher, Jonathan Andrew; and Kozarekar, Shailesh S.; Mitigation of Generator Overspeed During Wheel Slip Events, Ford Motor Company, Mar. 6, 2011.

*Primary Examiner* — Kevin Hurley
*Assistant Examiner* — Gabriela C Craciun
(74) *Attorney, Agent, or Firm* — David B. Kelley; Brooks Kushman P.C.

(57) ABSTRACT

A system an method for controlling a hybrid vehicle having a transmission coupled to vehicle wheels, an internal combustion engine, a planetary gearset coupled to the engine and to a differential output shaft to drive the vehicle wheels, a traction motor coupled through gearing to the differential output shaft and the planetary gearset, a generator coupled to the planetary gearset and electrically coupled to the fraction motor, a traction battery coupled to the generator and the traction motor, and at least one controller in communication with the engine, the traction motor, and the generator include limiting engine speed in response to a wheel slip event to an engine speed limit based on motor speed and generator speed to prevent the generator speed from exceeding a corresponding threshold when the wheel slip event terminates.

14 Claims, 3 Drawing Sheets

(56) References Cited

U.S. PATENT DOCUMENTS

| | | | |
|---|---|---|---|
| 4,936,405 A * | 6/1990 | Hrovat | 180/197 |
| 6,064,161 A | 5/2000 | Takahara et al. | |
| 6,317,665 B1 * | 11/2001 | Tabata et al. | 701/22 |
| 7,163,480 B2 * | 1/2007 | Supina et al. | 475/5 |
| 8,473,139 B1 | 6/2013 | Futamura | 701/22 |
| 2001/0025219 A1 * | 9/2001 | Ohba et al. | 701/89 |
| 2002/0052677 A1 | 5/2002 | Lasson et al. | |
| 2004/0163862 A1 * | 8/2004 | Yamaguchi | 180/65.2 |
| 2004/0176203 A1 * | 9/2004 | Supina et al. | 475/8 |
| 2006/0185914 A1 * | 8/2006 | Hommi | 180/65.1 |
| 2010/0022347 A1 * | 1/2010 | Irie | 477/3 |
| 2011/0060487 A1 * | 3/2011 | Jess et al. | 701/22 |
| 2011/0106350 A1 * | 5/2011 | Jalbout et al. | 701/22 |
| 2011/0115318 A1 * | 5/2011 | Hashimoto et al. | 310/78 |
| 2011/0276239 A1 * | 11/2011 | Nagashima et al. | 701/54 |
| 2012/0309587 A1 * | 12/2012 | Nozaki | 477/5 |
| 2013/0085634 A1 * | 4/2013 | Jinbo | 701/22 |
| 2013/0218389 A1 * | 8/2013 | Tanishima et al. | 701/22 |
| 2013/0226384 A1 * | 8/2013 | Tanishima et al. | 701/22 |
| 2013/0297136 A1 * | 11/2013 | Yamanaka et al. | 701/22 |
| 2013/0324360 A1 * | 12/2013 | Saito et al. | 477/5 |
| 2014/0257609 A1 * | 9/2014 | Dufford | 701/22 |
| 2014/0257664 A1 * | 9/2014 | Arbitmann et al. | 701/71 |
| 2014/0375115 A1 * | 12/2014 | Ajiro | 303/152 |

* cited by examiner

SYSTEM AND METHOD FOR HYBRID VEHICLE CONTROL DURING WHEEL SLIP EVENTS TO LIMIT GENERATOR SPEED

TECHNICAL FIELD

The present invention relates to hybrid electric vehicle (HEV) control during long duration wheel slip events to limit generator speed when regaining traction.

BACKGROUND

Traction control for automotive vehicles is well known. Traction control may use various strategies to reduce wheel slip during a wheel slip event. One approach utilizes a vehicle anti-lock braking system to detect and control wheel slip events. Engine torque may also be reduced under some conditions to reduce wheel slip. Wheel slip events in various HEV powertrains may present unique operating conditions not encountered in conventional vehicle powertrains. For example, some HEV powertrains use a single ratio gearing arrangement to connect the drive wheels to first and second electric machines that may operate primarily as a fraction motor and generator, respectively. An internal combustion engine may also be coupled to the drive wheels and the electric machines. In this arrangement, the speed of the traction motor is proportional to the speed of the wheels, and the speed of the generator is proportional to wheel speed and engine speed For a given vehicle speed, the generator speed will be highest when the engine is off. Because of the relationships between wheel speed, generator speed, and engine speed, operation in all-electric drive mode with the traction motor powering the drive wheels may be limited to a vehicle speed (or wheel speed) corresponding to a maximum desired generator speed.

Wheel slip events may occur due to various operating conditions or maneuvers. For example, rough or slippery road conditions, or aggressive handling of the vehicle may result in one or more wheels slipping or leaving the ground for an extended duration, such as for 1-2 seconds or more. This causes the slipping wheel or wheels to spin faster than wheels that continue to maintain traction. When the slipping wheel regains traction, the sudden reduction in wheel speed may result in a corresponding increase in speed of one or more connected powertrain components.

SUMMARY

A system and method for controlling a hybrid vehicle during a wheel slip event include a controller which limits engine speed during a wheel slip event to an engine speed limit based on motor speed and generator speed to prevent the generator speed from exceeding a corresponding threshold when the wheel slip event terminates.

In one embodiment, a hybrid vehicle comprises a transmission coupled to vehicle wheels, an internal combustion engine operable to output torque to drive the vehicle, a planetary gearset coupled to the engine and to a differential output shaft to drive the vehicle wheels, a traction motor, a generator interconnected to the planetary gearset and the traction motor, a traction battery coupled to the generator and the fraction motor, and at least one controller in communication with the engine, the generator, and the fraction motor. The controller is configured to limit engine speed during a wheel slip event to an engine speed limit based on motor speed and generator speed to prevent the generator speed from exceeding a corresponding threshold when the wheel slip event terminates.

Embodiments may include a method for controlling a hybrid vehicle having an engine, a motor, and a generator coupled to vehicle wheels comprising limiting engine speed during a wheel slip event to an engine speed limit based on motor speed and generator speed to limit the generator speed when the wheel slip event terminates. In this embodiment, the method may incorporate a controller configured to limit the engine speed to the lower of a maximum engine operating speed and a generator-speed-based engine speed limit when the wheel slip event is detected, or when the wheel slip event exceeds a predetermined time duration. The controller may also be configured to detect a wheel slip event based on a gear ratio and an angular velocity of the vehicle wheels with traction, the gear ratio being determined by an input of a differential output shaft and the motor.

In one embodiment, the system and method may limit engine speed to an adjustable constant value for the duration of the wheel slip event. The wheel slip event may be detected or triggered in response to angular velocity of at least one wheel exceeding angular velocity of one or more other wheels by a predetermined amount or value. Similarly, a wheel slip event may be detected or triggered in response to a difference in angular velocity between two wheels exceeding a corresponding threshold. A wheel slip event may also be initiated or triggered based on a signal or message from a vehicle subsystem, such as an anti-lock braking system or traction control system. In various embodiments, engine speed is limited only after a wheel slip event exceeds a corresponding time duration.

Embodiments include a system or method for controlling a hybrid vehicle having vehicle wheels continuously coupled through gearing to a traction motor, a generator, and an engine that limit engine speed in response to a wheel slip event to a value corresponding to a maximum generator speed based on anticipated wheel speed at the end of the wheel slip event when the wheel(s) regain traction. Engine speed may be limited in response to angular acceleration of the motor exceeding a corresponding threshold or in response to a vehicle speed determined based on traction motor speed. Traction motor speed may be determined based on a plurality of wheel speeds. Engine speed may be limited in response to a long duration wheel slip event to the lower of a maximum engine operating speed and a generator-speed-based engine operating speed. After the wheel slip event is detected, the controller may set the engine speed limit to an adjustable constant value for the duration of the wheel slip event. A wheel slip event may be detected or triggered in response to a signal or message from a vehicle subsystem, such as an anti-lock braking system or traction control system.

Embodiments according to the present disclosure may provide various advantages. For example, various embodiments limit engine speed to an adjustable constant during a wheel slip event to limit the generator speed to a corresponding threshold when the wheel slip event terminates. Reducing or preventing generator speed from exceeding a corresponding threshold upon termination of a wheel slip event may reduce noise, vibration, and harshness (NVH) and improve durability of various system components leading to an overall improvement in vehicle drivability and customer satisfaction.

The above advantages and other advantages and features will be readily apparent from the following detailed description of the preferred embodiments when taken in connection with the accompanying drawings.

DETAILED DESCRIPTION OF THE PREFERRED EMBODIMENT(S)

As required, detailed embodiments are disclosed herein; however, it is to be understood that the disclosed embodiments are merely exemplary and the claimed subject matter may be embodied in various and alternative forms. It is not intended that these embodiments illustrate and describe all possible forms of the claimed subject matter. Rather, the words used in the specification are words of description rather than limitation, and it is understood that various changes may be made without departing from the spirit and scope of the disclosure.

As those of ordinary skill in the art will understand, various features as illustrated and described with reference to any of the Figures may be combined with features illustrated in one or more other Figures to produce embodiments of the preset disclosure that are not explicitly illustrated or described. The combinations of features illustrated provide representative embodiments for typical applications. However, various combinations and modifications of the features consistent with the teachings of the present disclosure may be desired for particular applications or implementations.

The present disclosure recognizes that certain operating conditions associated with one or more wheels slipping in a hybrid vehicle may result in an undesirable increase in generator speed upon termination of the wheel slip event, particularly for hybrid vehicles having wheels continuously coupled through a gearing arrangement to the engine, motor, and generator. During vehicle testing of a representative configuration, generator speed exceeded a desired maximum speed when the vehicle regained traction after an extended wheel slip event. For example, during a limit handling test maneuver, one of the front tires left the ground for an extended duration of more than 1-2 seconds. This caused the front wheel to spin faster than the others. When the freewheeling tire reconnected with the ground, the generator speed increased beyond a desired maximum speed. The present disclosure recognizes that this situation may be attributed to an engine speed increase associated with detecting a vehicle speed increase due to the slipping wheel. When traction is regained, the engine inertia prevents the engine speed from being reduced quickly enough to accommodate the sudden change in measured wheel/vehicle speed. As such, the generator speed rapidly increases and may exceed a desired maximum generator speed. Excessive generator speeds may reduce durability of the generator or other vehicle components.

Embodiments according to the present disclosure limit engine speed in response to a wheel slip event that exceeds a calibratable duration, such as 1-2 seconds, so that the sudden increase in generator speed that results when the wheel regains traction reduces or prevents the generator speed from exceeding a desired maximum speed.

Figure 1:
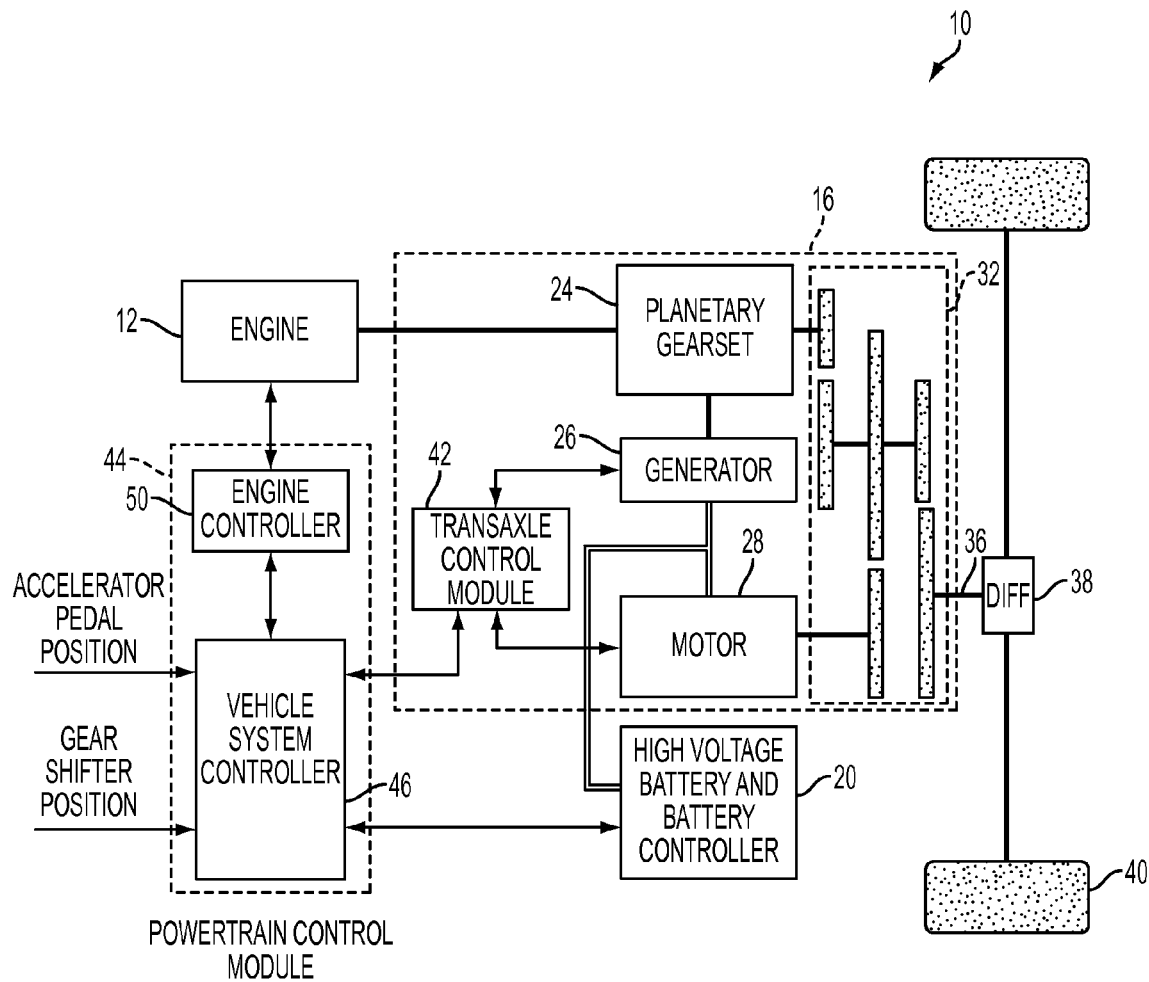
FIG. 1 is a block diagram illustrating operation of an exemplary embodiment of a system or method for limiting or controlling engine speed in a hybrid electric vehicle having a powertrain system configuration sometimes referred to as a powersplit configuration.

Referring now to FIG. 1, a block diagram of a vehicle 10 having a powersplit transmission system 16 illustrates operation of a representative embodiment of a system or method for controlling a hybrid vehicle during a wheel slip event to maintain generator speed below a desired maximum speed according to the present disclosure. System 10 includes an engine 12, a transmission 16, and a high-voltage traction battery 20. A planetary gear set 24 couples engine 12 and a generator 26 to a motor 28 through a plurality of gears 32 to deliver torque to vehicle wheels 40. Torque generated by engine 12 and/or motor 28 is transferred by a torque shaft 36 to a differential output shaft 38 to drive vehicle wheels 40.

As illustrated in FIG. 1, engine 12 is mechanically coupled to planetary gear set 24 which is also coupled to plurality of gears 32 and generator 26. Generator 26 is in electrical communication with motor 28. A controller, implemented by a transaxle control module (TCM) 42 in this embodiment, is connected to traction battery 20 and controls operation of motor 28 and generator 26. Additionally, the traction battery 20 is coupled to the generator 26 and the traction motor 28 and provides power to the vehicle system controller (VSC) 46 within the powertrain control module (PCM) 44. The VSC 46 is in communication with the TCM 42 and the engine controller 50. The VSC 46 and TCM 42 are configured to maintain component speeds within their operating limits. Engine controller 50 is configured to control the operation of the engine 12. Although illustrated as separate controllers, various control functions performed by any one of the controllers illustrated in FIG. 1 may be performed by one or more other controllers depending on the particular application and implementation. Similarly, control functions may be integrated into a single controller.

The controllers illustrated in FIG. 1, such as TCM 42, PCM 44, VSC 46 and engine controller 50, for example, generally include a microprocessor in communication with non-transitory computer readable storage media or devices, including volatile, persistent, and/or permanent memory devices such as random access memory (RAM) or keep-alive memory (KAM), for example. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the microprocessor to directly or indirectly control engine 12, generator 26, and motor 28. Various controllers may communicate with each other using a standard communication protocol, such as the controller area network (CAN) protocol, for example. One or more controllers may be in direct or indirect communication with associated sensors that measure or detect various vehicle and/or ambient operating conditions. Vehicle 10 may include one or more wheel speed sensors associated with corresponding wheels 40 to detect or measure angular velocity or acceleration of the associated wheel. Wheel speed sensors may communicate with an associated anti-lock brake system (ABS) or traction control system (TCS). As described in greater detail with reference to FIGS. 2 and 3, a wheel slip event may be determined based on individual wheel speeds relative to other wheel speeds, or may be determined by a subsystem controller such as an ABS or TCS controller and directly or indirectly communicated to TCM 42, PCM 44, VSC 46 and/or engine controller 50.

Figure 2:
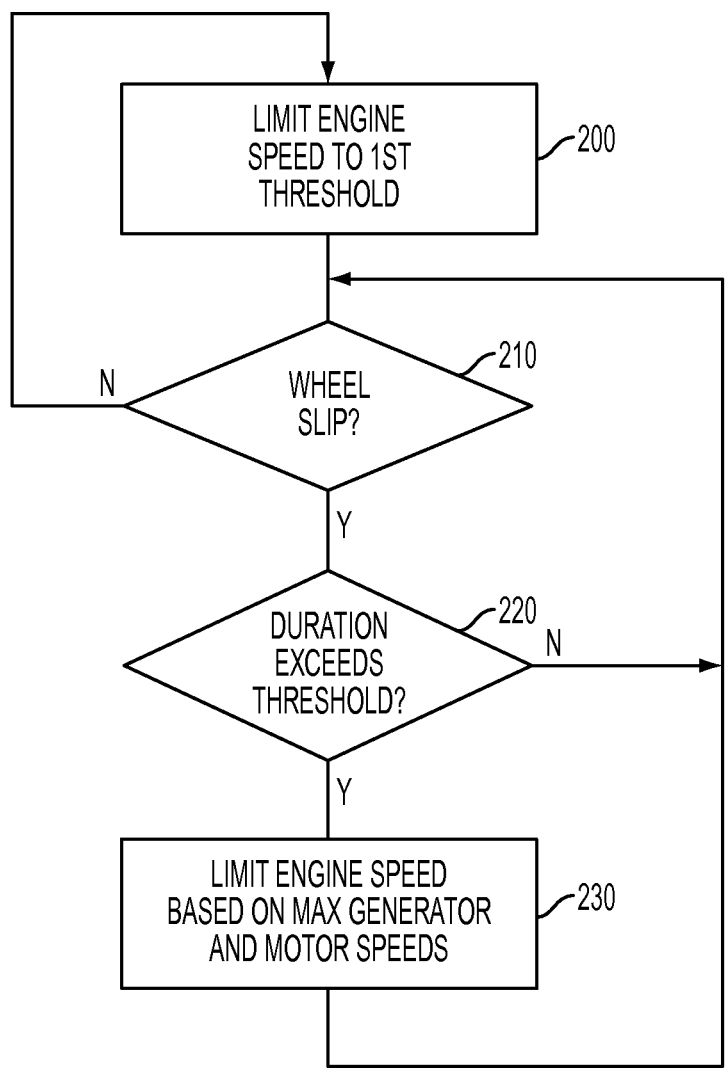
FIG. 2 is a simplified flowchart illustrating operation of a system or method for controlling a hybrid electric vehicle according to embodiments of the present disclosure.

As described in more detail with respect to FIG. 2, the control signals provided to engine 12 to control and limit speed of engine 12 may be determined by or communicated through VSC 46 or another controller. For example, VSC 46 may be configured to output a control signal to engine controller 50 which limits engine speed to a corresponding engine speed limit. In other words, either controller may be configured to limit engine speed during a wheel slip event to an engine speed limit based on motor speed and generator speed to prevent the generator speed from exceeding a corresponding threshold when the wheel slip event terminates.

With respect to FIG. 2, the flowchart depicts the system and method for controlling the HEV having a driveline including an engine 12, a motor 28, and generator 26 coupled to vehicle wheels 40 comprises, limiting engine speed during a wheel slip event to an engine speed limit based on motor speed and generator speed to prevent the generator speed from exceeding a corresponding threshold when the wheel slip event terminates. Control logic or functions performed by a processor, processing circuitry, or other control circuitry represented by the flow charts or similar diagrams of FIGS. 2 and 3. These figures provide representative control strategies and/or logic for a system or method that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described, but is provided for ease of illustration and description. The control logic may be implemented primarily in software executed by a microprocessor-based controller. Of course, the control logic may be implemented in software, hardware, or a combination of software and hardware in one or more controllers or processors depending upon the particular application. When implemented in software, the control logic may be provided in one or more non-transitory computer-readable storage devices or media having stored data representing code or instructions executed by a computer.

Various prior art hybrid vehicle control strategies increase engine speed as vehicle speed increases when the vehicle is being at least partially powered by the motor using the traction battery to provide desired vehicle performance as the vehicle speed nears the limit for operation using only the traction motor. During a wheel slip event, the control system could misinterpret the increase in motor speed due to wheel slip as an increase in overall vehicle speed. If the duration of the wheel slip event is long enough, the control system could respond to the perceived increase in vehicle speed by increasing the engine speed for better performance and acceleration. Because of the inertia of the engine, the engine speed may not be reduced quickly enough when the wheel slip event terminates due to the wheel(s) regaining traction, which may result in the generator speed exceeding a desired maximum speed. As such, embodiments according to the present disclosure limit engine speed during a wheel slip event so that the generator speed is maintained below the desired maximum speed upon termination of the wheel slip event.

For a powertrain configuration as illustrated in the block diagram of FIG. 1, the kinematics of the transaxle may be generally represented by:

$$\omega_{generator} = k_1 \omega_{engine} + k_2 \omega_{motor} \quad (1)$$

where $\omega_{generator}$ represents the angular velocity of the generator, $\omega_{engine}$ represents the angular velocity of the engine, $\omega_{motor}$ represents the angular velocity of the motor, and $k_1$ and $k_2$ are gear ratios associated with the plurality of meshing gears 32 and the planetary gearset 24. The angular velocity of the motor may be represented by:

$$\omega_{motor} = \frac{1}{2} k_3 [\omega_{Left\_Front\_Wheel} + \omega_{Right\_Front\_Wheel}] \quad (2)$$

where $k_3$ is the gear ratio between the differential input and the motor, which is multiplied by the average angular velocities of the front wheels assuming a 1:1 differential where the differential input (the motor) is the average of the outputs (the two wheels).

FIG. 2 is a simplified flowchart illustrating operation of a system or method for controlling a hybrid vehicle during a wheel slip event according to an exemplary embodiment of the present disclosure. As generally represented in FIGS. 1 and 2, the TCM 42 and VSC 46 are configured to maintain component speeds within associated operating limits. Given a generator speed limit represented by $\omega^{max}_{generator}$ (which may vary based on environmental and operating conditions) and the motor speed represented by $\omega_{motor}$ the controllers are configured to determine a corresponding maximum operating speed to maintain the generator speed below a desired maximum speed. The controllers use this limit and other inputs, such as driver requests based on accelerator pedal position and gear shifter position, for example, to control the engine to a target engine speed.

As previously described, a sudden reduction in wheel speed upon termination of a wheel slip event leads to a correspondingly sudden reduction in the motor speed and therefore the maximum engine speed limit as determined by the equations above. If the rate of change of the engine speed limit is greater than the ability of the control system to change the engine speed due to the component inertias, electric machine (motor) capabilities, and available electricity, for example, the generator speed may exceed the desired maximum generator speed. As such, the controllers are configured to limit the engine speed during a wheel slip event of sufficient duration as shown in the flow charts of FIGS. 2 and 3.

In FIG. 2, the controller determines a first engine speed limit based on the maximum generator speed as generally represented by block 200. The maximum generator speed may vary depending on environmental and operating conditions such as ambient or operating temperatures, battery state of charge, etc. Given the generator speed limit $\omega^{max\text{-}generator}$ and the motor speed, the controller calculates the maximum generator speed using the engine speed or angular velocity of the engine, motor speed or angular velocity of the motor, and corresponding gear ratios to limit the generator speed to a desired maximum speed.

The system or method monitor various conditions to detect a wheel slip event as represented by block 210. A wheel slip event may be detected by a relative difference between wheel speeds or angular velocities of two wheels exceeding a corresponding threshold or value. Similarly, a wheel speed or angular velocity that exceeds the average wheel speed of two or more non-slipping wheels may be used to trigger, initiate, or detect a wheel slip condition. The wheel slip event may be determined by any of the vehicle system or subsystem controllers and communicated directly or indirectly to the VSC and/or engine controller. For example, a wheel slip event may be detected by the vehicle ABS or TCS subsystems or controllers and communicated to the engine controller. In one embodiment, a wheel slip event is detected based on traction motor acceleration exceeding a corresponding threshold. Wheel slip events may be associated with loss of traction due to road conditions, such as wet, icy, loose, or rough road conditions. Wheel slip events may also be associated with one or more wheels losing contact with the road surface during aggressive vehicle maneuvers such as those performed during various vehicle development tests. For example, during a limit handling test or similar maneuvers, one or more tires may lose contact with the road surface for an extended period of time, such as more than 1-2 seconds. This may result in one or more wheels spinning faster than those that remain in contact with the road surface.

After a wheel slip event is detected/communicated as represented by block 210, the system or method may initiate a timer/counter to determine whether the wheel slip duration exceeds a corresponding threshold as represented by block 220. Representative duration thresholds may be in the range of 1-2 seconds, for example, but may vary depending on the particular application and implementation. The counter/timer is incremented while the wheel slip event continues with control returning to block 210. After the calibrated duration, the system and method limit the engine speed as represented by block 230. Various embodiments do not wait for the specified event duration before implementing the engine speed limit as represented by block 230.

Block 230 represents limiting engine speed during a wheel slip event as determined by block 210 to an engine speed limit based on motor speed and generator speed to reduce or prevent the generator speed from exceeding a corresponding maximum generator speed threshold when the wheel slip event terminates. The engine speed limit may be determined based on the gear ratio and angular velocity of a non-slipping vehicle wheel as previously described. The gear ratio may be determined based on the differential output shaft and the gear train connecting the engine and generator to the vehicle wheels. The system and method then control the engine in response to the vehicle speed and motor speed subject to the generator-speed-based engine speed limit.

Figure 3:
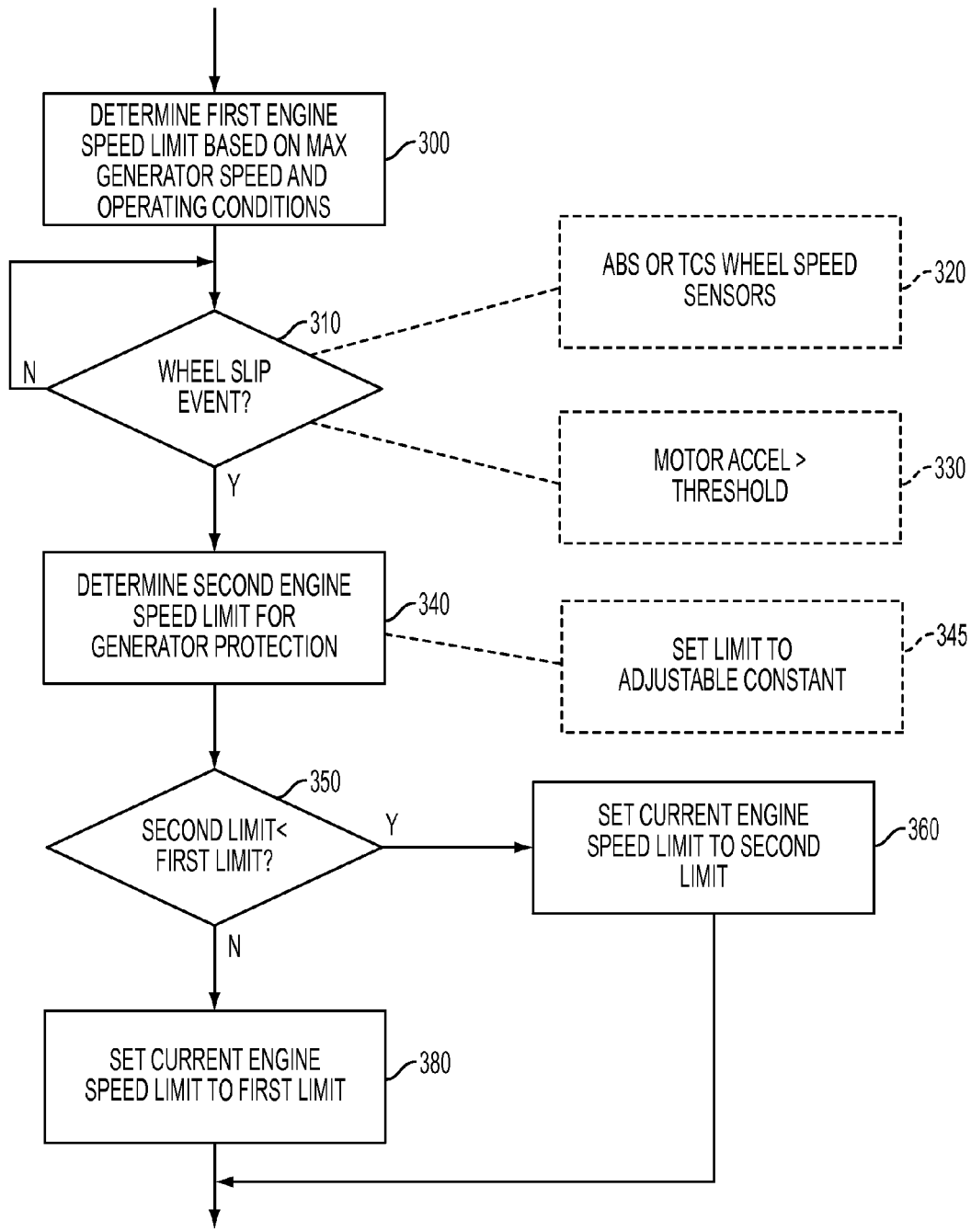
FIG. 3 is a more detailed flowchart depicting operation of a system or method for controlling a hybrid electric vehicle according to embodiments of the present disclosure.

With respect to FIG. 3, a more detailed representation of a system and method for controlling a hybrid electric vehicle during a wheel slip event to control generator speed is shown. As previously described, a representative hybrid vehicle includes a driveline including an engine 12, a motor 28, and generator 26 coupled to vehicle wheels 40 with one or more controllers configured to limit engine speed during a wheel slip event to an engine speed limit based on motor speed and generator speed to prevent the generator speed from exceeding a corresponding threshold when the wheel slip event terminates. Various steps or functions illustrated may be directly or indirectly performed or coordinated by one or more vehicle controllers, such as VSC 46 and/or engine controller 50, for example.

Block 300 represents determination of a first engine speed limit based on a maximum desired generator speed for current vehicle and/or ambient operating conditions. For example, maximum desired generator speed may decrease as ambient or operating temperature increases beyond a corresponding threshold. Operating conditions may also include vehicle speed such that the maximum desired generator speed is reduced as vehicle speed increases above a corresponding threshold.

Various operating conditions may be monitored during vehicle operation to detect a wheel slip event as represented by block 310. Many vehicles include anti-lock braking systems (ABS) and/or traction control systems (TCS) having sensors that determine the speed or angular velocity of each vehicle wheel. These vehicle systems or subsystems may include separate processors and/or electronics to detect a wheel slip condition as generally represented by block 320. If any one sensor registers an absolute speed that exceeds the others by an adjustable threshold, then that wheel is determined to be slipping. The ABS and/or TCS may identify wheels that are considered to be slipping and those that are not. The ABS and/or TCS may provide a signal or message to other vehicle controllers, such as the VSC or engine controller to identify a wheel slip condition and/or which wheel is slipping as previously described.

For vehicles that are not equipped with an ABS, TCS, or individual wheel speed sensors, a wheel slip event may be detected by calculating the angular acceleration of the motor using an associated motor position sensor (resolver) as generally represented by block 330. A wheel slip event is detected or triggered when the motor angular acceleration exceeds an adjustable or calibratable threshold.

During a wheel slip event as determined by block 310, the engine speed limit is modified, adjusted, or replaced by a second engine speed limit to limit generator speed to a desired limit upon termination of the wheel slip event as represented by block 340. Embodiments according to the disclosure may use various methods to determine the generator-speed-based engine speed limit represented by block 340. For example, one method is to calculate the engine speed limit using equation (1) and substituting $\omega_{motor\text{-}no\text{-}slip} = k_4 * (\omega_{wheel\text{-}full\text{-}traction})$ for the motor speed $\omega_{motor}$ where $k_4$ is a scaling factor. One advantage of this method is that it accounts for the effects of vehicle speed changes during the wheel slip event. However, it relies on detection or proper determination of a non-slipping wheel, which may not be available in all applications or under all operating conditions.

Another method for determining the generator-speed-based engine speed limit as represented by block 340 is to set the engine speed limit to the first limit as represented by block 300 and maintain that value for the duration of the wheel slip event, i.e. the engine speed limit would not be updated based on vehicle speed or other operating conditions during the wheel slip event. This approach assumes that the overall vehicle speed does not change significantly during the wheel slip event, which may not be a good assumption for various applications or operating conditions.

Yet another method for determining the engine speed limit as represented by block 340 is to set the engine speed limit to an adjustable constant value as represented by block 345. The adjustable constant value may be selected to maintain generator speed below a desired maximum speed regardless of vehicle speed. In forward gears, this may be determined using equation (1) by setting $\omega_{motor} = 0$, $\omega_{generator} = \omega_{generator\text{-}max}$, and solving the equation for $\omega_{engine}$.

Any of the previously described methods for determining or selecting an engine speed limit as represented by blocks 340, 345 may also include an adjustable offset or scaling factor to adjust the maximum engine speed limit to further assure that the generator speed will not exceed the desired maximum speed upon termination of the wheel slip event.

As also shown in FIG. 3, block 350 compares the engine speed limits and controls the engine to the lower of the two engine speed limits as generally represented by blocks 360 and 380. Various embodiments may apply rate limiting or filter the engine speed limit if there is a large difference between the first and second speed limits as represented by blocks 360 and 380 to prevent sudden changes in engine speed and any associated drivability/noise issues.

As such, embodiments according to the present disclosure may provide various advantages by limiting engine speed during a wheel slip event to limit the generator speed to a corresponding threshold when the wheel slip event terminates. Reducing or preventing generator speed from exceeding a corresponding threshold upon termination of a wheel slip event may reduce noise, vibration, and harshness (NVH) and improve durability of various system components leading to an overall improvement in vehicle drivability and customer satisfaction.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. Those of ordinary skill in the art will recognize that any embodiments described as providing advantages or being preferred over other embodiments or prior art implementations with respect to one or more desired characteristics may include attributes that depend on the specific application and implementation and may be compromised to achieve overall system characteristics. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid vehicle including an engine, a motor, and a generator coupled to vehicle wheels, comprising:
    a controller configured to limit engine speed during a wheel slip event to an engine speed limit based on motor speed and generator speed to limit generator speed to a corresponding threshold when the wheel slip event terminates, wherein the controller limits engine speed in response to vehicle speed calculated based on the motor speed.

2. The hybrid vehicle of claim 1 wherein the controller is configured to limit the engine speed in response to a wheel slip event having a duration exceeding a time threshold to a generator-based engine speed limit corresponding to a maximum generator speed based on anticipated wheel speed after the wheel slip event terminates.

3. The hybrid vehicle of claim 1 wherein the controller is configured to limit the engine speed to an adjustable constant value during the wheel slip event.

4. The hybrid vehicle of claim 1 wherein the controller is configured to limit engine speed in response to a wheel slip event based on a gear ratio and an angular velocity of at least one non-slipping vehicle wheel, the gear ratio being determined by differential output shaft speed and motor speed.

5. The hybrid vehicle of claim 1 wherein the controller is configured to limit engine speed based on a wheel slip event in response to angular velocity of a first vehicle wheel exceeding angular velocity of a second vehicle wheel by a corresponding threshold.

6. The hybrid vehicle of claim 1 wherein the controller is configured to limit engine speed to a generator-based engine speed limit in response to angular acceleration of the motor exceeding a corresponding threshold.

7. A hybrid vehicle having a transmission coupled to vehicle wheels, comprising:
    an internal combustion engine;
    a planetary gearset coupled to the engine and to a differential output shaft to drive the vehicle wheels;
    a traction motor coupled through gearing to the differential output shaft and the planetary gearset;
    a generator coupled to the planetary gearset and electrically coupled to the traction motor;
    a traction battery coupled to the generator and the traction motor; and
    at least one controller in communication with the engine, the traction motor, and the generator and configured to limit engine speed in response to a wheel slip event to an engine speed limit based on motor speed and generator speed to prevent the generator speed from exceeding a corresponding threshold when the wheel slip event terminates, wherein the at least one controller limits engine speed to a lower one of a generator-speed-based engine speed corresponding to generator speed associated with wheel speed after a wheel slip event, and a maximum operating engine speed limit.

8. The hybrid vehicle of claim 7 wherein the at least one controller is configured to limit engine speed in response to a wheel slip event exceeding a corresponding time duration.

9. The hybrid vehicle of claim 7 wherein the at least one controller is configured to limit engine speed in response to a difference in angular velocity of two vehicle wheels exceeding a corresponding threshold for a predetermined time period.

10. A vehicle including an engine, a motor, and a generator coupled to vehicle wheels, comprising:
    a wheel speed sensor; and
    a controller communicating with the wheel speed sensor and configured to limit engine speed during a wheel slip event to an engine speed limit based on a lower one of a first engine speed corresponding to generator speed associated with wheel speed after the wheel slip event, and a second maximum operating engine speed limit.

11. The vehicle of claim 10 wherein the controller is configured to limit the engine speed to an adjustable constant value during the wheel slip event.

12. The vehicle of claim 10 wherein the controller is configured to limit engine speed in response to the wheel slip event based on a gear ratio and an angular velocity of at least one non-slipping vehicle wheel, the gear ratio being determined by differential output shaft speed and motor speed.

13. The vehicle of claim 10 wherein the controller is configured to limit engine speed based on the wheel slip event in response to angular velocity of a first vehicle wheel exceeding angular velocity of a second vehicle wheel by a corresponding threshold.

14. The vehicle of claim 10 wherein the controller is configured to limit the engine speed in response to the wheel slip event having a duration exceeding a time threshold.

* * * * *